US005769049A

United States Patent [19]

Nytomt et al.

[11] Patent Number: 5,769,049

[45] Date of Patent: Jun. 23, 1998

[54] METHOD AND SYSTEM FOR CONTROLLING COMBUSTION ENGINES

[75] Inventors: Jan Nytomt; Thomas Johansson, both of Åmål, Sweden

[73] Assignee: Mecel AB, Sweden

[21] Appl. No.: 704,720

[22] PCT Filed: Jan. 18, 1996

[86] PCT No.: PCT/SE96/00048

§ 371 Date: Sep. 17, 1996

§ 102(e) Date: Sep. 17, 1996

[87] PCT Pub. No.: WO96/22458

PCT Pub. Date: Jul. 25, 1996

[30] Foreign Application Priority Data

Jan. 18, 1995 [SE] Sweden .................................. 9500189

[51] Int. Cl.[6] ........................... F02D 41/14; G01M 15/00

[52] U.S. Cl. ............................... 123/435; 73/1.06; 73/116

[58] Field of Search .................................... 123/435, 425; 73/1.03, 1.06, 35.08, 115, 116, 117.3

[56] References Cited

U.S. PATENT DOCUMENTS

| | | | |
|---|---|---|---|
| 4,380,986 | 4/1983 | Latsch et al. | 123/687 |
| 4,535,740 | 8/1985 | Ma | 123/435 |
| 4,964,388 | 10/1990 | LeFebvre | 123/435 |
| 5,036,669 | 8/1991 | Earlson et al. | 60/602 |
| 5,253,627 | 10/1993 | Miyata et al. | 123/435 |
| 5,425,339 | 6/1995 | Fukui | 123/435 |

OTHER PUBLICATIONS

Derwent's abstract, No 86–142780/22, week 8622, Abstract Of SU, 1188355 (As KIRG Car Electr (MOAU=), 30 Oct. 1985.

*Primary Examiner*—Andrew M. Dolinar

*Attorney, Agent, or Firm*—Ostrolenk, Faber, Gerb & Soffen, LLP

[57] ABSTRACT

A method and system for controlling combustion engines by detection of the present air/fuel ratio within the cylinders of the combustion engine, using an analysis of the characteristics of the ionization current, as detected via a measuring gap with a bias voltage applied being arranged in the combustion chamber, preferably using the spark plug gap in an Otto-engine. A measuring voltage corresponding to the degree of ionization is detected during the flame ionization phase and during a time- or crankshaft position dependent period A, B, C or D, which duration is dependent of the present air/fuel ratio, and will be finished by an amplitude maximum PF during the flame ionization phase. A parameter characteristic for the fundamental frequency of the measuring voltage during the period A, B, C or D is detected, which parameter indicates a tendency towards the rich direction of stoichiometric when the fundamental frequency increases, and inversely indicates lean tendency when the fundamental frequency decreases. The fundamental frequency is preferably detected from the differential value of the measuring voltage during the period A, B, C or D, in respect of time t or crankshaft degrees VC. $dU_{ION}/dt$ respectively $dU_{ION}/dVC$. The differential value multiplied with a constant is used at least partly when determining a relative or absolute air/fuel ratio.

14 Claims, 3 Drawing Sheets

METHOD AND SYSTEM FOR CONTROLLING COMBUSTION ENGINES

BACKGROUND OF THE INVENTION

The present invention relates to a method and system for controlling combustion engines, wherein the present air/fuel ratio within the cylinders of the combustion chamber is detected by analyzing the characteristics of the ion current, the ion current being detected via a measuring gap arranged within the combustion chamber.

Lambda sensors are often used in order to obtain closed loop control of stochiometric combustion in combustion engines. A stochiometric combustion is the ideal operation mode for a conventional three-way catalytic converter. The type of lambda sensor used in mass-produced cars has been a so-called narrow-banded lambda sensor, which exhibits a distinct transition of its output signal at a lambda value just below 1.0. This type of narrow-banded lambda sensor is used in order to control the combustion, wherein the control is operated such that the output signal of the lambda sensor switches between a low and high output signal. The order of deviation from the transition point has not been able to be detected by these narrowly-banded lambda sensors, which is the reason why these nanow-banded lambda sensors have not been used in closed loop control of combustion at other air/fuel ratios. An alternative to the narrow-banded lambda sensor is the linear type of lambda sensor, but this sensor is very expensive, at least 10-fold, and could therefore in terms of cost not justify an introduction in mass-produced cars. The linear type of lambda sensor emits an output signal proportional to the present air/fuel ratio, enabling a closed loop control also at lean mixtures in the range $\lambda$=1.1–1.4, as well as at richer air/fuel ratios in the range $\lambda$=0.8–0.09 or below. An alternative to lambda sensors is shown in U.S. Pat. No. 4,535,740 which employs an ion current sensor in the combustion chamber and where the spark gap of the conventional spark plug is used as a measuring gap enabling detection of the burn duration within the combustion chamber. A parameter representative of the burn duration, and thus the air/fuel ratio, is detected by measuring the length of time the ion current signal is above a predetermined threshold value. At certain operating ranges where the ion current signal exhibits a low accuracy, the closed loop control is based upon the burn duration. The characteristics of the burn duration varies considerably at different operating cases, i.e. load and rpm's, and for that reason alone there is a need for a number of different threshold values to be used for the detection of burn duration, or alternatively of using different weight factors for different load cases.

SUMMARY OF THE INVENTION

An object of the invention is to obtain a simplified and more reliable detection of the present airlfuel ratio within the combustion chamber by detection of the ion current within the combustion chamber and preferably by using the spark plug gap of the combustion chamber as a measuring gap.

Another object is to obtain a method and system for detecting the air/fuel ratio using a simple differentiator circuit or a differentiator algorithm implemented in the software of a micro computer based control unit for the ion Current signal processing, which circuit only needs a measuring window of short duration during the combustion process in order to be able to extract the information necessary for the determination of the air/fuel ratio. The necessary hardware and software for the determination of airlfuel ratio could then be implemented in a cost efficient manner having a low computational load upon the computational capacity of the control system, which, in turn, will release computational capacity for other type of control or control algorithms.

Yet another object is to obtain a method and a system for detecting the airlfuel ratio, which method is less susceptible for operating cases at leaner air/fuel ratios, a so called lean-burn control, at which lean conditions the ion current signal is subjected to large variations between successive combustions in aspects of burn duration as well as peak amplitudes.

Yet another object is to obtain a detection of the present air/fuel ratio within each individual cylinder without using additional sensors, such individual cylinder detection of the present air/fuel ratio having a faster response compared with a simple lambda sensor being arranged in the exhaust system at a distance from the cylinders of the combustion engine. An individual cylinder control enabling an optimal combustion within each cylinder, unlike a control having a single lambda sensor in the exhaust system after the exhaust manifold. In the single lambda sensor system the total averaged exhaust flow may be controlled such that the residual amount of air in the exhaust is kept at set limits, while the combustion in some individual cylinders occurs at rich air/fuel ratios and combustion in others occurs at lean air/fuel ratios.

Another object for systems having a lambda sensor is to obtain a supplementary detection of the present air/fuel ratio, whereby the supplementary detection could be used for verification and control of the lambda sensor in the exhaust system. In another application in engines not having lambda sensors the inventive method may be used in order to obtain a feedback signal representative for the present airlfuel redo from each cylinder.

The foregoing and other objects are achieved according to one aspect of the invention by a method for controlling combustion engines by detection of the present air/fuel ratio, A/F, within the combustion chambers of the combustion engine, the air/fuel ratio being determined at least partly from an evaluation of the output signal from an ionization sensor arranged within the combustion chamber. In accordance with the invention, the method includes the steps of: measuring an output signal, $U_{ION}$, from the ionization sensor; determining from the output signal for each combustion of the combustion chamber a characteristic parameter characteristic of a fundamental frequency during at least a part of a flame ionization phase occurring during each combustion, a richer than a stoichiometric ratio of A/F being indicated when the characteristic parameter corresponds to an increased frequency of the fundamental frequency and a leaner than a stoichiometric ratio of A/F being indicated when the extracted parameter corresponds to a decreased frequency of the fundamental frequency; and controlling the combustion engine in accordance with the characteristic parameter.

In accordance with another aspect, the invention is directed to a system for controlling a combustion engine by detection of the present air/fuel ratio, A/F, within a combustion chamber of the combustion engine, having a measuring gap arranged within the combustion chamber. In accordance with the invention, the system includes: a detection circuit coupled to the measuring gap for detecting the degree of ionization within the combustion chamber and for generating an output signal; and a microcomputer based control unit for receiving the output signal. The control unit includes: differentiator means for obtaining a differential value of the output signal during a measuring window initiated during a flame ionization phase; a non-volatile memory for storing a value dependent on a differential value of the output signal from the detection circuit; and arithmetic means for determining an air/fuel ratio by multiplication of at least one factor corresponding to a constant C stored in the memory, said factor being multiplied with the differential value dependent on the output signal.

Other features and advantages of the present invention will become apparent from the following description of the invention which refers to the accompanying drawings.

Other distinguishing features and advantages will appear from the characterizing clauses of the remaining claims and the following description of preferred embodiments. The descriptions of embodiments are made by reference to the figures specified in the following list of figures.

DESCRIPTION OF EXEMPLARY EMBODIMENTS

Figure 1:
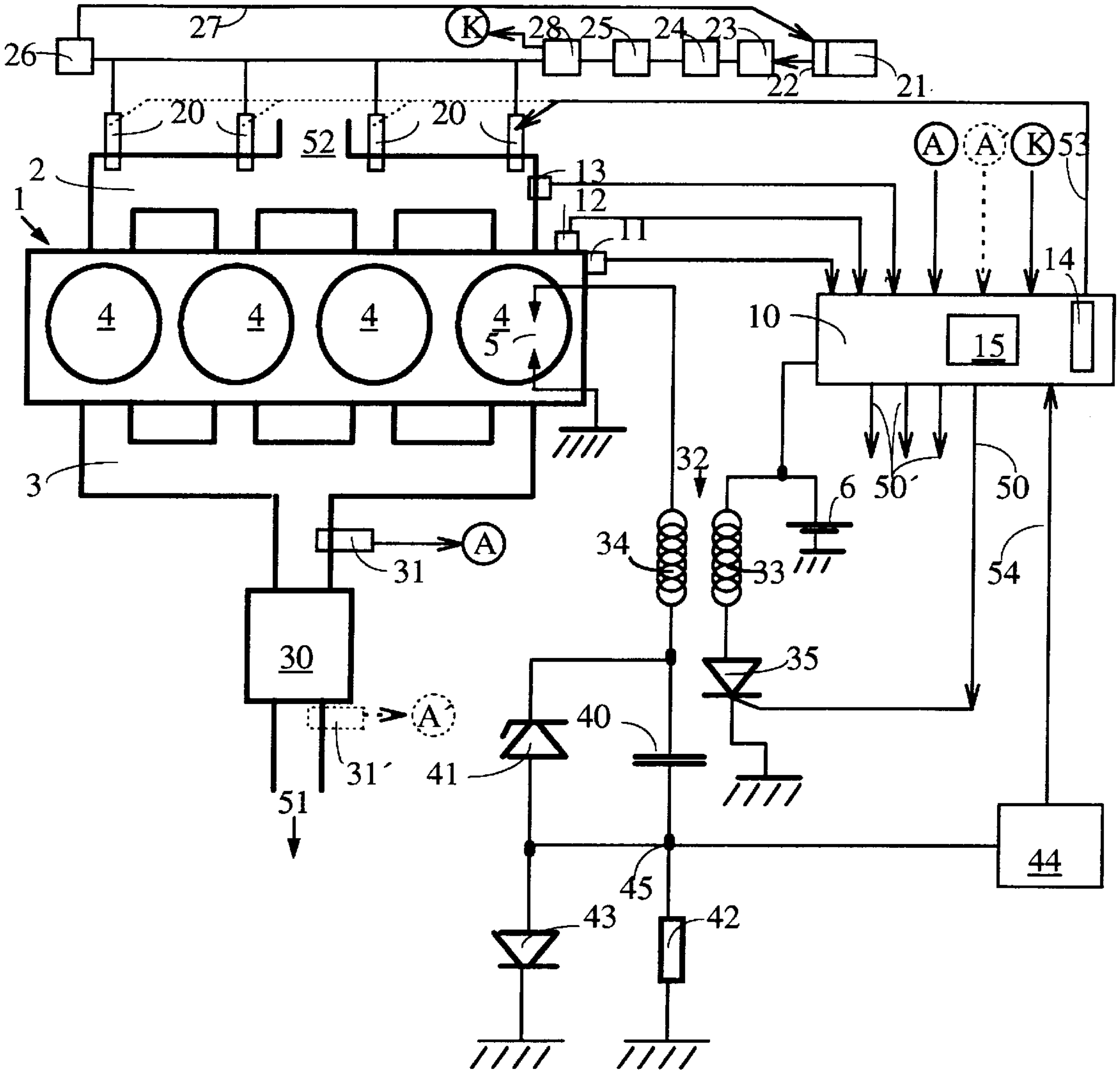
FIG. 1 shows schematically an arrangement for controlling a combustion engine and detection of the degree of ionization within the combustion chamber.

FIG. 1 is shown shows an arrangement for controlling a combustion engine 1. A fully electronic control system for the fuel supply as well as ignition timing for the combustion engine is shown. A microcomputer 10 control the ignition timing as well as the amount of fuel supplied dependent on engine speed, engine temperature and engine load, detected by the sensors 11,12,13 respectively. The sensor 11 is preferably a conventional type of pulse-transmitter, detecting cogs at the outer periphery of the flywheel. A positioning signal could also be obtained by the sensor 11, by one or more cogs having varying tooth width, or alternatively varying tooth gap, at a stationary crankshaft position. The microcomputer 10 includes a customary type of arithmetic unit 15 and memories 14, storing control algorithms, fuel maps and ignition timing maps.

At least one spark plug 5 is arranged in each cylinder, with only one spark plug intended for a cylinder shown in FIG. 1 for the sake of simplicity of explanation. The ignition voltage is generated in an ignition coil 32, having a primary winding 33 and a secondary winding 34. One end of the primary winding 33 is connected to a voltage source, a battery 6, and the other end is connected to ground via an electrically controlled switch 35. A current starts to flow through the primary winding 33 when the control output 50 of the microcomputer 10 switches the switch 35 to a conductive state. When the current is cut out, a step up transformation of the ignition voltage will be obtained in the secondary winding 34 of the ignition coil 32 in a conventional manner, and an ignition spark will be generated in the spark gap 5. Start and stop of the current flow, so called dwell-time control, is controlled dependent on the present parameters of the engine and according to a pre-stored ignition map in the memory 14 of the microcomputer 10. Dwell-time control controls that the primary current reaches the level necessary and that the ignition spark is generated at the ignition timing necessary for the present load case.

One end of the secondary winding is connected to the spark plug 5, and the other end, which is connected to ground includes a detector circuit detecting the degree of ionization within the combustion chamber. The detector circuit includes a voltage accumulator, here in the form of a chargeable capacitor 40, which capacitor biases the spark gap of the ignition plug with a substantially constant measuring voltage. The capacitor is equivalent to the embodiment shown in EP,C,188180, where the voltage accumulator is a step-up transformed voltage from the charging circuit of a capacitive type of ignition system. In the embodiment shown in FIG. 1, the capacitor 40 is charged when the ignition pulse is generated, to a voltage level given by the break-down voltage of the zener diode 41. This break-down voltage could lie in the interval between 80–400 volts. When the stepped up ignition voltage about 30–40 kVolts is to generated in the secondary winding, the zener diode breaks down which assures that the capacitor 40 will not be charged to a higher voltage level than the break-down voltage of the zener diode. In parallel with the measuring resistance 42 is a protecting diode connected with reversed polarity, which in a corresponding manner protects against over voltages of reversed polarity.

The current in the circuit 5-34-40/40-42-ground, which could be detected at the measuring resistance 42, is dependent on the conductivity of the combustion gases in the combustion chamber. The conductivity in turn is dependent on the degree of ionization within the combustion chamber.

By the measuring resistance 42 being connected close to ground only one connection to the measuring point 45 is necessary for the detector circuit 44. The detector circuit 44 measures the potential over the resistance 42 at measuring point 45 relative to ground. By analyzing the current, or alternatively the voltage, through the measuring resistance a knocking condition or preignition among other conditions could be detected. As has been mentioned in U.S. Pat. No. 4,535,740 during certain operating cases the present air-fuel ratio could also be detected by measuring how long the ionization current is above a certain level.

With a lambda sensor 31 arranged in the exhaust manifold of the combustion engine upstream of a catalyst 30 arranged in the exhaust manifold, the residual amount of oxygen, and hence also the present mixture ratio of air-fuel, could be detected. With a conventional narrow-banded lambda sensor, having an output signal with a distinct transition just below stochiometric mixtures, the fuel amount given from a stored fuel map could be corrected. The correction is made in order to maintain the ideal mixture redo of air-fuel for the function of the catalyst 30. By the output signal A from the lambda sensor a feed back control of the fuel supply could be obtained, which control is performed in such a way that the output signal from the lambda sensor oscillates between a high and a low output signal up to a couple of times per second.

The fuel supply system of the combustion engine includes in a conventional manner a fuel tank 21 having a fuel pump 22 arranged in the tank. The pressurized fuel is supplied from the pump 22 to a pressure equalizer 23, and further on to a fuel filter 24 and other containers 25, or volumes, including the fuel rail. A pressure regulator 26 is arranged at one end of the fuel rail which at exceeding pressures, opens for a return flow in the return line 27, back to the fuel tank 21 or the fuel pump 22. An alternative to a pressure regulator 26 opening at excessive pressures could be a pressure controlled fuel pump. whereby the return line 27 could be avoided The accumulated volumes of the fuel pump unit 22, the pressure equalizer 23, the fuel filter 24 and other cavities or volumes 25, are of such order that operation for a couple of minutes could take place before a new type of fuel being fuelled to the tank reaches the fuel injectors 20. The fuel injectors 20 are preferably arranged in the inlet channel of each cylinder, and preferably operated sequentially in synchronism with the opening of the inlet valve of the cylinder, respectively. The amount of fuel supplied is determined by the length of the control pulse emitted by the microcomputer 10 to a fuel injector. The amount of fuel, as well as ignition timing, is controlled dependent on present engine parameters according to prestored fuel- and ignition timing maps contained in the memory 14 of the microcomputer 10. The fuel amount given by the map could possibly be corrected by the lambda sensor output. In a certain type of fuel control system a fuel quality sensor 28 could also be arranged in the fuel supply system. The fuel control could with a fuel quality sensor 28 be adjusted to the present octane number or mixture ratio of methanol and petrol. The microprocessor 10 could obtain an input signal K from the fuel quality sensor indicating the present fuel quality.

A problem with combustion engines of today is that the control of the fuel supply at an optimal stochiometric mixture could not be obtained in a feed back manner before the lambda sensor reached its operating temperature. For the purpose of reaching the operating temperature faster, and thus enabling correction of the fuel supply sooner, pre-heating of the lambda sensor has been implemented. Even when pre-heating has been implemented, the proper operating temperature is delayed about 30 seconds. Before reaching the proper operating temperature the fuel control will only be performed with the assistance of empirically determined rules, without any feed back information concerning the present air-fuel ratio. Even when an air-mass sensor is arranged in the inlet manifold, the proper amount of fuel for all operating cases could not be supplied, for example, an operating case having cold walls of the inlet manifold, condensing more or less amounts of fuel, which condensed amounts of fuel are not supplied to the combustion chamber. In order to obtain a smooth running of the engine, a deliberate enrichment of fuel has been made, which enrichment is disadvantageous for emissions. The emissions from cold starts is an important problem, because considerably more than 50%, and in some case as much as 90–95%, of the accumulated emissions during an emission test cycle is obtained during the cold start phase before the lambda has reached its operating temperature. If a reliable method could control the air-fuel mixture at a predetermined lean limit, or at the limit for a stable combustion, before the lambda sensor has reached its operating temperature, then a dramatic reduction of the emissions could be obtained, as well as reduction of the fuel consumption.

Figure 2:
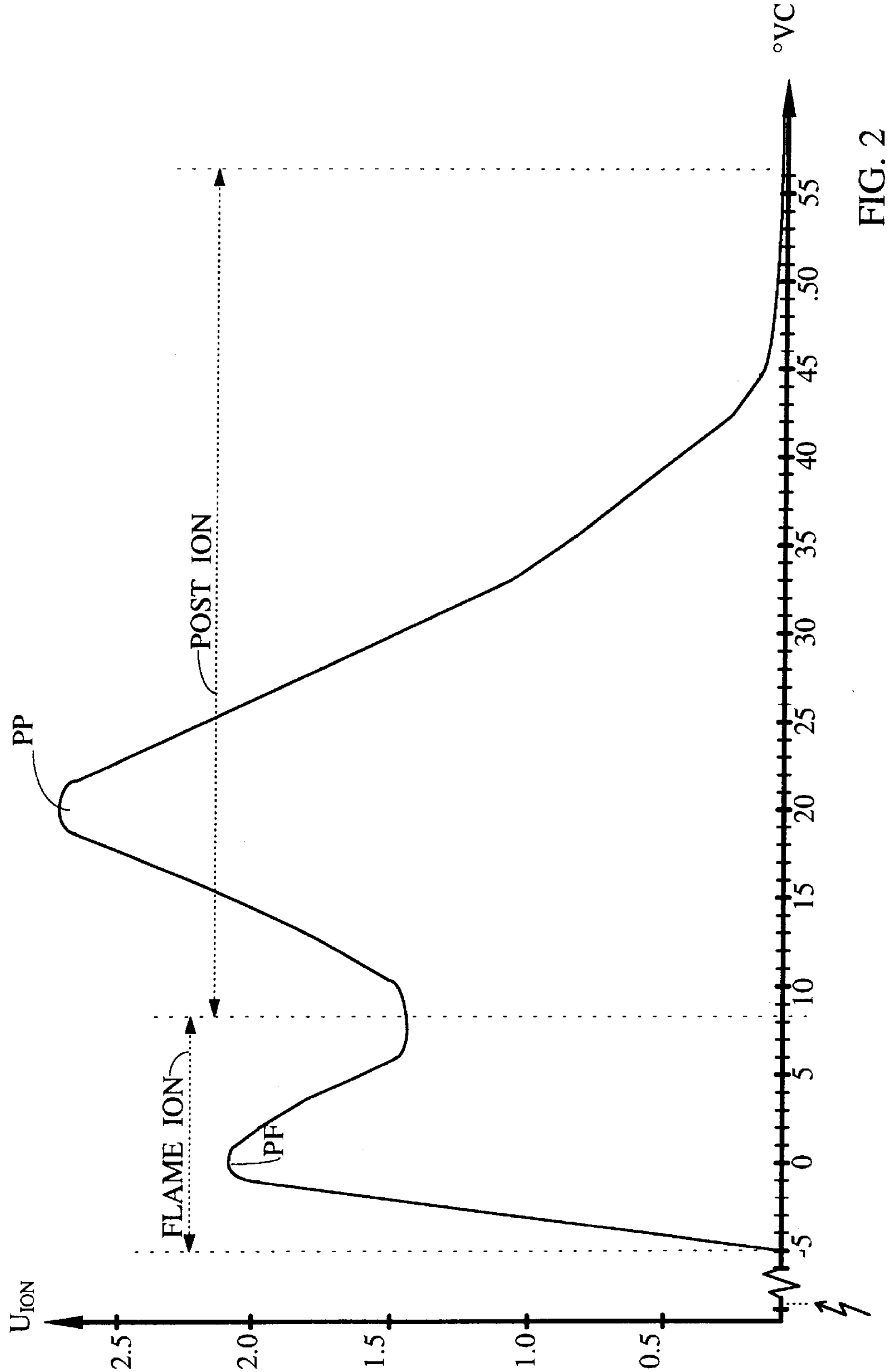
FIG. 2 shows a typical ion current signal, as detected by an arrangement shown in FIG. 1.

FIG. 2 schematically shows the ion current signal UION as obtained with a measuring arrangement according to FIG. 1. The signal level UION measured in volts is shown at the Y-axis, and the output signal could lie in the range 0–2.5 volt. At the X-axis crankshaft degrees °VC is shown, where 0° denotes the upper dead position when the piston is occupying its uppermost position. At the position SP, which is a position before the upper dead position and preferably 15–20 crankshaft degrees before upper dead position, the ignition spark is generated at the ignition advance timing requested at the prevailing operating conditions, which are primarily dependent on load and rpm. The generation of the ignition spark induces a high measuring pulse in the detection circuit 4-45. caused by the spark discharge in the spark plug gap during the so called break down phase, but this high measuring pulse is filtered out, and the corresponding value is not used in the preferred embodiment. The collection of measured values is preferably controlled by the micro computer 10, in such a way that the micro computer only reads the signal input 54 at certain engine positions or at certain points of time, i.e. in defined measuring windows. These measuring windows are activated preferably dependent on the ignition timing SP, in order for these measuring windows to be opened a sufficiently long time after the spark discharge has attenuated properly.

After the break down phase the flame ionization phase is initiated, in FIG. 2 denoted FLAME ION, during which phase the measuring voltage is affected by the establishment of a burning kernel of the air/fuel mixture in or near the spark plug gap.

After the flame ionization phase, the post ionization phase is initiated, in FIG. 2 denoted as POST ION, during which phase the measuring voltage is affected by the combustion within the combustion chamber, which combustion causes an increase of the number of ionizing particles at increasing temperature and combustion pressure. The typical behaviour is that a maximum value is reached during POST ION, denoted as PP in FIG. 2, when the combustion pressure has reached its maximum value and the flame front has reached the walls of the combustion chamber, which causes an increase in pressure.

The transition between the flame ionization phase and the post ionization phase and the peak values within each respective phase could preferably be detected by a differentiator circuit, or alternatively a differentiator algorithm implemented in the software of the microcomputer 10 unit. The first zero crossing of the differential coefficient $DU_{ION}/dVC$ will detect the peak value PF, the second zero crossing of the differential coefficient will detect the transition between the flame ionization phase and the post ionization phase and the third zero crossing will detect the peak value PP.

Figure 3:
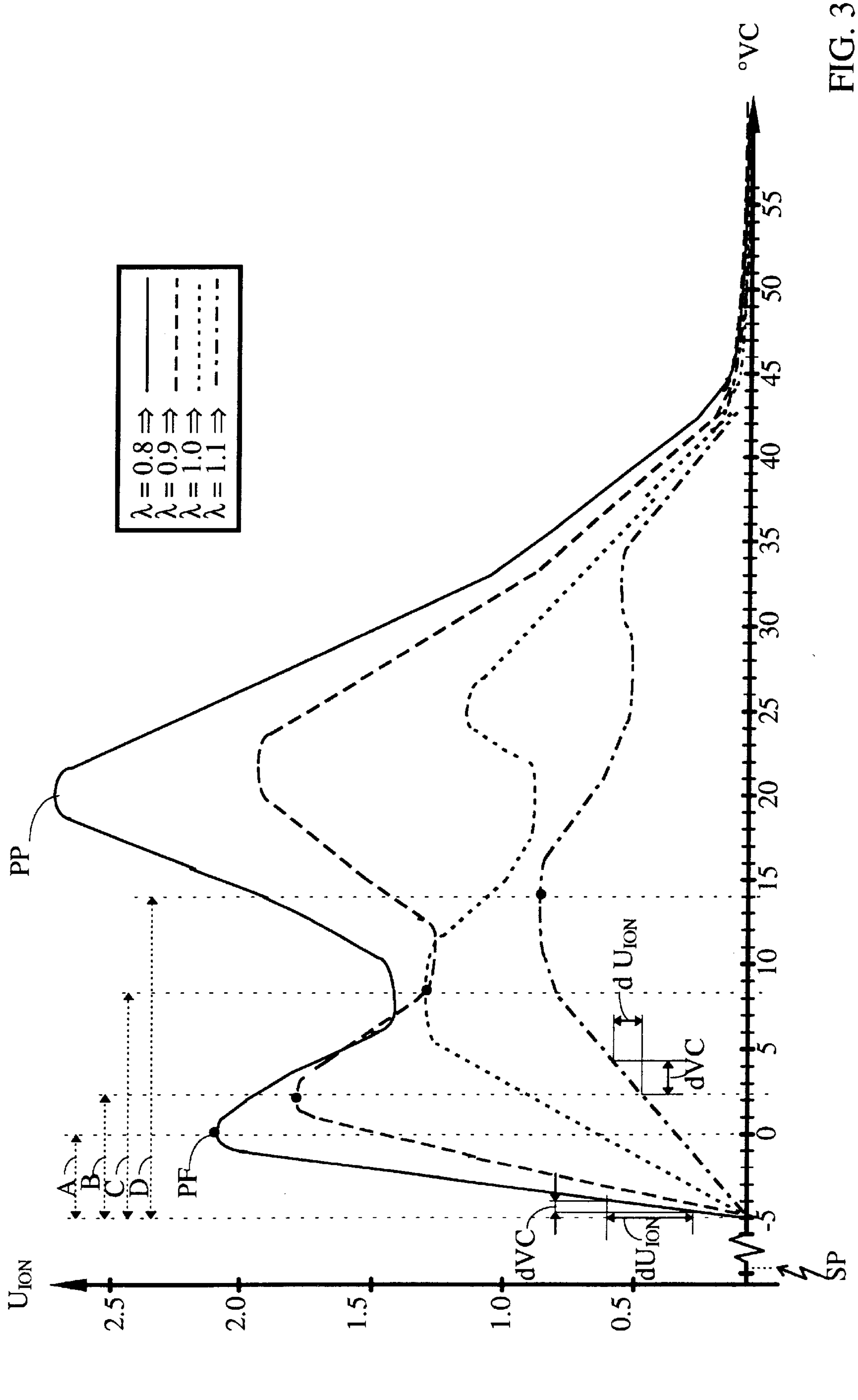
FIG. 3 shows different types of ion current signals obtained from different air/fuel ratios.

FIG. 3 schematically shows different types of measuring signals as detected with a detection circuit, as shown in FIG. 1, at different airlfuel ratios. The curves shown in FIG. 3 are obtained from operating cycles at 2000 rpm and averaged over 500 cycles. The non-broken curve shows combustions at λ=0.8, the score marked curve shows combustions at λ=0.9, the dot marked curve shows combustions at λ=1.0 and the score-dotted curve shows combustions at λ=1.1. A stochiometric air/fuel ratio at λ=1.0 is ideal for a conventional catalytic converter, while λ=0.8 represents a richer air/fuel ratio and λ=1.1 represents a leaner airlfuel ratio. The voltage $U_{ION}$, representative of the ionization current after the break down phase, is sampled from 5 crankshaft degrees before the upper dead position (OD) and at least to about 55 crankshaft degrees after OD. The first break down phase, which occurs between the generation of the spark SP and before 5 crankshaft degrees before OD, is not included in the curves, which curves shows the flame ionization phase (FLAME ION) and the post ionization phase (POST ION). It is evident from the figure that the frequency characteristic of the fundamental frequency of the ion current signal increases with richer airlfuel ratios during the flame phase.

At an airlfuel ratio on the rich side of stochiometric, λ0.8, the measuring signal increases rapidly towards its peak value PF during the crankshaft angle range A. At successive regulation in steps in the lean direction towards λ=0.9, λ=1.0 and λ=1.1, then the increase rate of the measuring signal will decline, and the respective peak values during the flame ionization phase will be reached only after having passed the crankshaft angle ranges B, C and D, respectively.

The frequency characteristic of the fundamental frequency of the measuring signal during the respective crankshaft range A, B, C and D of each curve, i.e. during a fourth of a complete signal period, will thus increase with richer airlfuel mixtures.

Another method for extracting the frequency characteristic of the fundamental frequency of the ion current signal is to observe the differential value $dU_{ION}/dVC$, i.e. the voltage $U_{ION}$, as a function of the crankshaft angle VC. This could be done with the detection circuit 44 shown in FIG. 1. In this way the present lambda value could be measured at the very first or the first number of combustions during a cold start, and there is no need to wait some thirty seconds in order for the lambda sensor 31 to reach the proper operauing temperature.

By using a sampling technique, i.e. reading and storing the voltage $U_{ION}$ at the measuring point 45, representative for the ion current over a number of incremental crankshaft ranges dVC, and starting from just before upper dead position ÖD and ending 55–90 crankshaft degrees after ÖD, a representation of the ion current will be obtained over the present crankshaft range. Assuming a very simple relation that the lambda value A is directly proportional to the voltage $U_{ION}$ representative of the ion current the following expression will be obtained;

$$\lambda = C \cdot dU_{ION}/dVC \text{ , where C is a constant.} \quad (1)$$

The correspondence between the crankshaft angle VC and time t, for each cycle over 720 crankshaft degrees and for a defined speed of the engine N(rpm), is given by; dVC/dt=720 (°/cycle)·N/60 (cycles/second)=12 N (°/sec), whereby $$dt/dVC = 1/12\ N.$$

The expression (1) above could thus be stated as:

$$\lambda = C \cdot dU_{ION}/dt \cdot dt/dVC = C/12N \cdot dU_{ION/dt} \quad (2)$$

When determining the constant C, the system is operated with a catalytic reactor having reached its operating temperature, preferably a broad banded lambda sensor with a continuous signal representative of the present lambda value, or alternatively, a narrow banded lambda sensor. When determining the constant C, the number of revolutions N is given from a speed sensor (11) and the detection circuit 44 will detect $U_{ION}$ at the measuring point 45.

The difficulties lies in to be able to measure $DU_{ION}/dt$ in a sufficiently accurate manner, but for a basic implementation it will be sufficient to calculate an approximation of the differential $DU_{ION}/dt$ by using the formula;

$$DU_{ION}/dt \approx \{U_{ION}(t+h) - U_{ION}(t-h)\}/2h, \quad (3)$$

where h = the sampling period.

If the expressions (2) and (3) are combined, then the constant could be expressed as;

$$C \approx 24\lambda Nh/\{U_{ION}(t+h) - U_{ION}(t-h)\} \quad (4)$$

If Cλ is defined as C / 24, then the following expression will be obtained;

$$C_{\lambda \approx \lambda N\ h/\{UION}(t+h) - U_{ION}(t-h)\} \quad (5)$$

This basic model for determination of λ was tested during a number of cycles with a linear lambda sensor, where $C_\lambda$ was established. The operating cycles included different air/fuel ratios, where output signals $dU_{ION}/dVC$ from 500 combustions and for each air/fuel ratio was sampled. A very good correlation was obtained between the reading from the lambda sensor and the lambda value calculated from $dU_{ION}/dVC$ . Cycle-to-cycle variation was below 17% before the computed lambda value from $dU_{ION}/dVC$ had been processed further, i.e. using filtering techniques and/or using averaging methods.

The major reason for the variation is the natural variation between successive cycles in an Otto engine, and where the inherent slow response of the lambda sensor brings about a continuous filtering and averaging. A linear type of lambda sensor exhibits a step response in the order of at least thirty combustions, before the lambda sensor reaches a new stable level of the output signal when subjected to a sudden change of the air/fuel ratio from one ratio to another.

In order to improve the correlation to some extent between the lambda sensor and the calculated lambda value from $dU_{ION}/dVC$, and in order to imitate the inertia of the lambda sensor, the calculated value from $dU_{ION}/dVC$ could be further processed with a continuous running average procedure, where the calculated value from only the 10–30 immediately preceding combustions are included.

A 10% variation in relation to the linear lambda sensor has been obtained in tests when only measured values from the 16 preceding cycles (i.e. 16 combustions) are included in the running average, and if the running average is calculated based upon sampled ion current data obtained from operating cases at λ1.0. The method with a running average from the 16 preceding cycles could thus be used with sufficient accuracy to detect transitions of the lambda value from λ=1.0 to λ=1.1, or transitions from λ0.9 to λ=1.

In order to further improve the signal processing obtaining an Output signal in conformity with the linear lambda sensor, a prediction procedure could be used where measured data from a smaller number of preceding combustions are used for the prediction of the next value to be measured. The prediction procedure is preferably performed in software of the microcomputer 10. During this prediction, for example, measured data from only the 24 immediately preceding combustions could be used for the prediction. If the next measured value deviates excessively in relation to the predicted value, for example, if the measured value deviates more than 10–20% from the predicted value, then the latest measured value is rejected, and the running average is not updated. In this way occasionally occurring stray data caused by disturbances could be discarded, which data is not representative of the present combustion in the cylinder.

A prediction is preferably also used for the control of the amount of fuel supplied during transient load cases, for example, during throttle up movements with successively increasing amounts of fuel supplied. During these transient load cases, the lambda value could be supervised by a prediction procedure, where the measured values $dU_{ION}/dt$ from 24 of the latest preceding combustions are included. When the prediction detects a deviation tendency from the ideal stochiometric ratio, then the fuel supply is controlled. If the prediction thus detects a tendency towards the rich side of stochiometric, then, for example, the rate of fuel increase could be reduced during throttle up operation, whereby the fuel increase during the entire throttle up operation could be controlled such that a stochiometric ratio is maintained. A prediction based upon measured values $dU_{ION}/dt$ during the flame ionization phase from a limited number of cycles enables an improved response per cylinder and a more accurate control of the amount of fuel supplied, compared to what could be obtained with a single lambda sensor. The prediction over a predetermined number of cycles is performed in order for occasional extreme measured values not causing undesirable effects in aspects of control. The lambda sensor has besides its natural inertia the drawback of being situated at a distance from the combustion chamber, which will cause a delay. Systems in multi cylinder engines having a single lambda sensor have furthermore the disadvantage that the lambda sensor detects the residual amount of air in the accumulated exhaust flow from all cylinders, which could result in some cylinders operating at rich conditions while some others simultaneously are operating at lean conditions, while the residual amount of air in the accumulated exhaust flow indicates a stochiometnc combustion.

The adopted basic model described above has been able to prove that the lambda value could be determined by detecting the first order frequency of the fundamental frequency of the ion current signal or, as it conveniently may be implemented in a control system, by detecting $dU_{ION}/dVC$ during the flame ionization phase.

In further refined models the linear relation could be complemented with correction factors in respect of the present temperature of engine coolant, exterior temperature, present speed/rpm and/or load. But even the basic model could enable implementation of lambda detection in less complex two stroke engines not having lambda sensors, but where the control of the air/fuel ratio could be performed in order to decrease fuel consumption and decrease the emission levels.

In combustion engines equipped with a lambda sensor a calibration of the constant C could be initiated as soon as the lambda sensor has reached its operating temperature. This calibration could continuously be activated after a certain operating time, for example, 2 minutes after engine start up and complemented with activations at predetermined intervals, for example, each 5th–15th minute, whereby an adaptation to different fuel qualities could be obtained for an optimal control. Different types of fuel additives and different grades of fuel could occur at markets where the standards for fuel quality allows such variation. These variations could in certain cases cause variations within certain limits of the ability to ignite and the degree of ionization of the air/fuel mixture, which might affect the deterrrunation of the lambda value from the calculated $dU_{ION}/dVC$ value. At each cold start, there is a residual amount of fuel in the intermediate volumes 22–27 between the fuel tank 21 and the injectors 20 having the same quality as the fuel used before shut down. At this cold start the lambda value could thus be calculated upon the latest established constant C. After a certain period of operation the latest refuelled fuel quality will reach the intermediate volumes 2227 and the injectors 20, and a renewed establishment of tile constant C is required.

If the combustion engine, for example, is equipped with a narrow banded lambda sensor, then the signal $dU_{ION}/dVC$ could be sampled and stored and, when the output signal from the lambda sensor switches, then the signal $dU_{ION}/dVC$ from the combustion/combustions immediately preceding and immediately succeeding the switching event of the output signal could be used, possibly with averaging. In order to be used for determination of the constant C, preferably signals $dU_{ION}/dVC$ are sampled and stored from a number of switching events of the output signal from the lambda sensor before the constant C is established.

The determination of the lambda value from the calculation of $dU_{ION}/dVC$ could also be used for verification of the efficiency of the ordinary lambda sensor 31. In order to obtain an approved system at certain markets a control of equipment, such as lambda sensors, affecting emission levels is requested. For this purpose the combustion engine could be equipped with a second lambda sensor 31', being arranged behind the catalytic converter 30 as seen in the direction of exhaust flow, which second lambda sensor is used primarily for verification of the functionality of the catalytic converter 30 but also for verification of the first lambda sensor 31 arranged upstream of the catalytic reactor 30. By using the value $dU_{ION}/dt$ from the ion current signal when verifying the functionality of the lambda sensor an increased reliability could be obtained for the verification of the functionality of the critical lambda sensor. If only dual lambda sensors are used, one before and one after the catalytic converter, for verification purposes of the functionality of the lambda sensor located before the catalytic converter, at certain circumstances a nondetectable malfunction could exist at the lambda sensor if both lambda sensors have detonated in a similar manner, for example, due to deposits from the exhaust gases.

A fuel quality sensor 28 could also modify establishment of the lambda value as based from the value $dU_{ION}/dt$, for example by adaptively modifying the constant C in relation to the present fuel quality. Different fuel additives or mixtures of, for example, methanol/petrol affect the differential value $dU_{ION}/dt$. An increase of methanol content of the fuel requires an increase of the amount of fuel supplied to the cylinders in order to obtain a stochiometric combustion.

The invention is not limited to detection of the fundamental frequency or the differential value. The invention could within the scope of the claims be modified in such a manner that a parameter characteristic of a frequency content of the fundamental frequency, for example, could imply a detection of how rapidly the amplitude maximum PF during the flame ionization phase occurs. A simple detection of the time for the occurrence of the amplitude maximum is strictly dependent on the differential value $dU_{ION}/dt$, and thus characteristic of the fundamental frequency. In a similar manner a calculation of time or a differential value of other amplitude maxima or gradients of the measuring signal $dU_{ION}/dt$ could be used, for example the gradient after the amplitude maximum PF during the flame ionization phase or corresponding gradients during the post ionization phase before or after the amplitude maximum PP of the post ionization phase. This is because these differential values are strictly dependent on the differential value $dU_{ION}/dt$ during the flame ionization phase (FLAME ION) before the amplitude maximum PF, and thus characteristic of the fundamental frequency of the measuring voltage obtained during the flame ionization phase. The preferred embodiment, having a measuring window during the flame ionization phase before the amplitude maximum PF, is however the easiest embodiment which could be implemented in a control system, because this phase is relatively unambiguously determined dependent on the ignition timing event.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A method for controlling combustion engines by detection of the present air/fuel ratio, A/F, within the combustion chambers of the combustion engine, the air/fuel ratio being determined at least partly from an evaluation of the output signal from an ionization sensor arranged within the combustion chamber, which method comprises:

measuring an output signal, $U_{ION}$, from the ionization sensor;

determining from the output signal for each combustion of the combustion chamber a characteristic parameter characteristic of a fundamental frequency during at least a part of a flame ionization phase occurring during each combustion, a richer than a stoichiometric ratio of A/F being indicated when the characteristic parameter corresponds to a fundamental frequency higher than a predetermined value and a leaner than a stoichiometric ratio of A/F being indicated when the extracted parameter corresponds to a fundamental frequency lower than a predetermined value; and controlling the combustion engine in accordance with the characteristic parameter.

2. A method according to claim 1, wherein the characteristic parameter of the output signal, $U_{ION}$, constitutes the first order differential value $dU_{ION}/dt$ or dU/dVC, where t represents time and VC represents crankshaft angle.

3. A method according to claim 2, wherein the output signal, $U_{ION}$, is measured within a defined measuring window during the flame ionization phase.

4. A method according to claim 3, wherein the output signal, $U_{ION}$, is measured before the output signal reaches its maximum value.

5. A method according to claim 1, wherein the frequency content of the output signal from the ionization sensor exceeding the predetermined value of the fundamental frequency is filtered out during the flame ionization phase.

6. A method according to claim 1, including determining an absolute air/fuel mixture by calibrating the measured value of the characteristic parameter, said calibration being made against measurements of an output signal from a lambda sensor in an exhaust system of the combustion engine, and the correlation between the output signal, $U_{ION}$, from the ionization sensor and the output signal $\lambda_{OUT}$ from the lambda sensor being established by determination of at least one constant C, wherein $\lambda_{OUT}=C\cdot d\,U_{ION}/dt$ or $\lambda_{OUT}=C\cdot U_{ION}/dVC$, t representing time and VC representing crankshaft degrees.

7. A method according to claim 6, wherein the determination of the absolute air/fuel ratio A/F is performed using the characteristic parameter until the lambda sensor reaches its operating temperature.

8. A method according to claim 7, wherein after the lambda sensor reaches its operating temperature, the constant C is stored in a non-volatile memory.

9. A method according to claim 8, wherein the value of the characteristic parameter is calibrated in relation to a fuel quality sensor arranged in the fuel supply system, such calibration being stored in a non-volatile memory.

10. A method according to claim 9, wherein the characteristic parameter after each combustion is averaged in a running average from the 10–30 last occurring number of combustions, and the value obtained from the averaging procedure is used for control of the combustion engine.

11. A method according to claim 10, wherein the characteristic parameter determined after each combustion is compared with a predicted value based upon a smaller number of successive and preceding combustions and when a predetermined deviation occurs from the predicted value, the latest measured value of the characteristic parameter is not included when determining the running average.

12. A method according to claim 6, wherein after the measured value of the characteristic parameter has been calibrated in relation to the lambda sensor, only the output signal from the ionization signal is used to determine the air/fuel ratio.

13. A method according to claim 1, wherein when the characteristic parameter indicates a tendency towards the rich side of the stoichiometric ratio, the amount of fuel is decreased, and when the characteristic parameter indicates a tendency towards the lean side of the stoichiometric ratio, the amount of fuel is increased.

14. A system for controlling a combustion engine by detection of the present air/fuel ratio, A/F, within a combustion chamber of the combustion engine, having a measuring gap arranged within the combustion chamber, which system comprises:

a detection circuit coupled to the measuring gap for detecting the degree of ionization within the combustion chamber and for generating an output signal; and a microcomputer based control unit for receiving the output signal, the control unit including:

differentiator means for obtaining a differential value of the output signal during a measuring window initiated during a flame ionization phase;

a non-volatile memory for storing a value dependent on a differential value of the output signal from the detection circuit; and arithmetic means for determining an air/fuel ratio by multiplication of at least one factor corresponding to a constant C stored in the memory, said factor being multiplied with the differential value dependent on the output signal.

* * * * *